US007793052B2

(12) United States Patent
Goodman et al.

(10) Patent No.: US 7,793,052 B2
(45) Date of Patent: Sep. 7, 2010

(54) SYSTEM AND METHOD FOR IMPLEMENTING HYBRID SINGLE-COMPARE-SINGLE-STORE OPERATIONS

(75) Inventors: James R. Goodman, Auckland (NZ); Mark S. Moir, Windham, NH (US); Fu'ad W. F. Al Tabba', Auckland (NZ); Cong Wang, Auckland (NZ)

(73) Assignee: Oracle America, Inc., Redwood City, CA (US)

( * ) Notice: Subject to any disclaimer, the term of this patent is extended or adjusted under 35 U.S.C. 154(b) by 430 days.

(21) Appl. No.: 11/967,358

(22) Filed: Dec. 31, 2007

(65) Prior Publication Data

US 2009/0172299 A1 Jul. 2, 2009

(51) Int. Cl.
  *G06F 12/00* (2006.01)
(52) U.S. Cl. .................. 711/147; 711/150; 711/152
(58) Field of Classification Search .................. None
  See application file for complete search history.

(56) References Cited

U.S. PATENT DOCUMENTS

| 7,293,143 | B1 | 11/2007 | Shavit et al. | |
|---|---|---|---|---|
| 7,395,382 | B1 * | 7/2008 | Moir | 711/147 |
| 2007/0028056 | A1 | 2/2007 | Harris | |
| 2007/0055960 | A1 | 3/2007 | Damron et al. | |
| 2007/0233970 | A1 | 10/2007 | Saha et al. | |
| 2007/0288587 | A1 | 12/2007 | Aguilera et al. | |
| 2009/0172303 | A1 * | 7/2009 | Welc et al. | 711/154 |

OTHER PUBLICATIONS

Damron et al., "Hybrid transactional memory", ASPLOS 2006.
Michael and Scott, "Nonblocking Algorithms and Preemption-Safe Locking on Multiprogrammed Shared Memory Multiprocessors", Journal of Parallel and Distributed Computing, 51(1), 1998.
Dice and Shavit, "What really makes transactions faster?", Transact 2006.
Harris and Fraser, "Language support for lightweight transactions", OOPSLA 2003.
Marathe and Moir. "Efficient Nonblocking Software Transactional Memory", Proceedings of the 12th ACM SIGPLAN symposium on Principles and practice of parallel programming PPoPP'07 Mar. 14-17, 2007, San Jose, California, USA.
U.S. Appl. No. 10/915,502, filed Aug. 10, 2004.
Dice et al., "Transactional Locking II", Proceedings of the 20th International Symposium on Distributed Computing. DISC 2006. Sep. 18-20, 2006.

* cited by examiner

*Primary Examiner*—Kevin Verbrugge
(74) *Attorney, Agent, or Firm*—Robert C. Kowert; Meyertons, Hood, Kivlin, Kowert & Goetzel, P.C.

(57) ABSTRACT

A hybrid Single-Compare-Single-Store (SCSS) operation may exploit best-effort hardware transactional memory (HTM) for good performance in the case that it succeeds, and may transparently resort to software-mediated transactions if the hardware transactional mechanisms fail. The SCSS operation may compare a value in a control location to a specified expected value, and if they match, may store a new value in a separate data location. The control value may include a global lock, a transaction status indicator, and/or a portion of an ownership record, in different embodiments. If another transaction in progress owns the data location, the SCSS operation may abort the other transaction or may help it complete by copying the other transactions' write set into its own right set before acquiring ownership. A hybrid SCSS operation, which is usually nonblocking, may be applied to building software transactional memories (STMs) and/or hybrid transactional memories (HyTMs), in some embodiments.

20 Claims, 9 Drawing Sheets

SYSTEM AND METHOD FOR IMPLEMENTING HYBRID SINGLE-COMPARE-SINGLE-STORE OPERATIONS

BACKGROUND OF THE INVENTION

1. Field of the Invention

This invention relates generally to coordination amongst concurrent execution sequences in a multiprocessor, and more particularly, to a system and method for coordinating access to shared objects in a transactional memory space using hardware/software hybrid operations.

2. Description of the Related Art

In concurrent software designs and implementations, it is often important to ensure that one thread does not observe partial results of an operation that is concurrently being executed by another thread. Such assurances are important for practical and productive software development because, without them, it can be extremely difficult to reason about the interactions of concurrent threads.

Transactional memory is a paradigm that allows a programmer to design code as if multiple locations can be accessed and/or modified in a single atomic step. As typically defined, a transactional memory interface allows a programmer to designate certain sequences of operations as "atomic blocks", which are guaranteed by the transactional memory implementation to either take effect atomically and in their entirety (in which case they are said to succeed), or have no externally visible effect (in which case they are said to fail). Thus, with transactional memory, it may be possible in many cases to complete multiple operations with no possibility of another thread observing partial results, even without holding any locks. The transactional paradigm can significantly simplify the design of concurrent programs.

Transactional Memory (TM) allows programmers to use transactional or atomic blocks, which may be considered sequential code blocks that should be executed atomically. In other words, executions of atomic blocks by different threads do not appear to be interleaved. To execute an atomic block, the underlying system may begin a transaction, execute the atomic block's memory accesses using that transaction, and then may try to commit the transaction. If the transaction commits successfully, the atomic block's execution seems to take effect atomically at the transaction's commit point. If it fails, the execution does not seem to take effect at all and the atomic block might be retried using a new transaction. It is the responsibility of the TM implementation to guarantee the atomicity of operations executed by transactions.

Transactional memory is widely recognized as a promising paradigm for allowing a programmer to make updates to multiple locations in a manner that is apparently atomic, while addressing many of the problems associated with the use of locks. In general, transactional memory can be implemented in hardware (HTM), with the hardware directly ensuring that a transaction is atomic, or in software (STM) that provides the "illusion" that the transaction is atomic, even though in fact it is executed in smaller atomic steps by the underlying hardware. While HTM solutions are generally faster than STM ones, "best effort" HTM may not be guaranteed to be able commit any particular transaction, in which case a programmer cannot rely solely on HTM, even if it is almost always effective.

SUMMARY

Systems and methods for implementing and using hybrid Single-Compare-Single-Store (SCSS) operations are disclosed. The systems described herein may exploit hardware transactional memory (HTM) support in the common case that it succeeds, and may transparently use compatible alternative techniques when the HTM is not effective. A hybrid SCSS operation, which is usually nonblocking, may be applied to building software transactional memories (STMs) and/or hybrid transactional memories (HyTMs), in some embodiments. A hybrid SCSS technique may also be applicable in other contexts.

An SCSS operation may have inputs that include the address of a control location in shared memory, an expected value of the control location, the address of a data location in shared memory, and a new value to store in the data location. The SCSS operation may compare the value stored in the control location to the expected value, and if the control value matches the expected value, may store the new value in the specified data location. The control location and the data location may be included in distinct, separately addressable storage locations in a same shared memory or in two different shared memories, in different embodiments. If the SCSS operation is successful (i.e., if the new value is stored in the specified data location), it may return an indication that the operation succeeded (e.g., a Boolean value of "true"), and if it is not successful, it may return an indication that the operation failed (e.g., a Boolean value of "false"). The actions of the SCSS operation are executed atomically, such that they appear to take effect together without any intervening change in the value of the data location and without any intervening change in the control value.

A hybrid SCSS operation may first attempt to perform the SCSS operation as a hardware transaction on a transactable data location, and if the hardware transaction fails (i.e., if it is unable to commit), the SCSS operation may be retried using a software-mediated transaction. In some embodiments, a global lock may be configured to indicate whether a software-mediated transaction is in progress. In such embodiments, the hardware transaction may examine the global lock, and abort prior to completion if it indicates that a software-mediated transaction is currently in progress.

If the hardware transaction is aborted or fails to commit and the SCSS operation is retried using a software-mediated transaction, the software transaction may attempt to acquire the global lock before performing the comparison with the control location and the storage of the new value. If the global lock indicates that another software-mediated transaction is currently in progress, the software transaction may repeatedly attempt to acquire the global lock until it is successful.

In some embodiments, a global lock and/or a control value may be included in a control location that also includes other control bits. For example, in one embodiment, the control value used in the comparison of the SCSS operation may be a transaction status indicator included in a transaction status record. In another example, the control value may be a portion of an ownership record associated with the specified data location. In embodiments in which the control location is an ownership record, if the ownership record indicates that the specified data location is owned by another transaction, the SCSS operation may abort the other transaction, or may copy the write set of the other transaction into its own a write set and acquire ownership of the data location, in different embodiments.

The methods described herein may be implemented by program instructions included in a memory coupled to one or more processors in a computing system, (e.g., by program instructions included in a computer-readable storage medium and executable by the one or more processors in the computing system), in some embodiments. The program instructions may be included in the same memory as one in which the shared data object(s) and/or shared control location(s) are instantiated, or in a different memory, in different embodiments.

Figure 1:
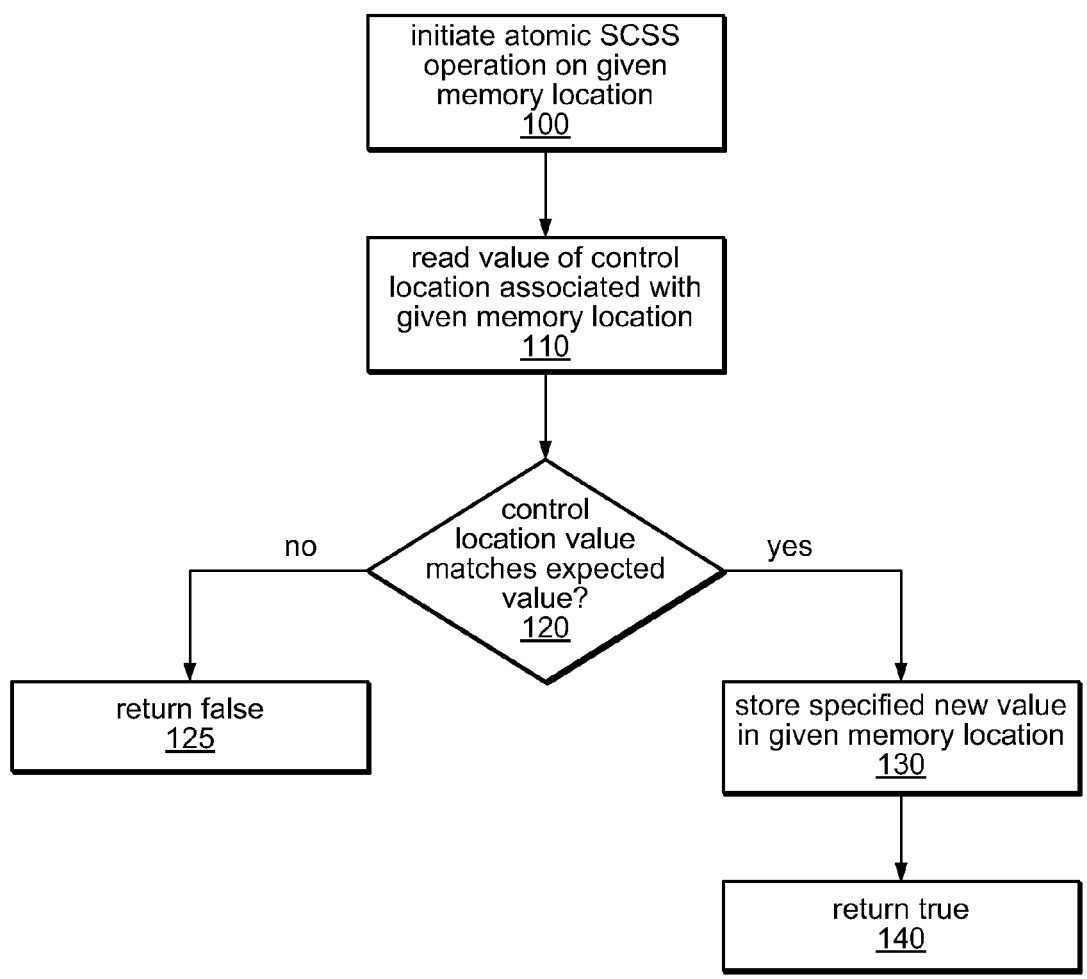
FIG. 1 is a flowchart illustrating one embodiment of a method for executing a Single-Compare-Single-Store (SCSS) operation, as described herein.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Systems and methods for implementing and using hybrid Single-Compare-Single-Store (SCSS) operations are disclosed. As noted above, hybrid SCSS operations may exploit HTM support in the common case that it works, and may thus be nonblocking in most cases. In the event that the HTM support is not effective, hybrid SCSS operations may transparently employ compatible alternative techniques.

Coordination between concurrent threads in a shared memory multiprocessor may be significantly simplified in a number of scenarios by the availability of an operation that can atomically:

compare a "control" memory location to an "expected value";

store a "new value" to a separate "data" memory location contingent upon this comparison succeeding; and return a Boolean value indicating whether the store occurred In general, SCSS operations may provide the ability to atomically confirm that one "control" location contains a specified "expected value" and if so to store a "new value" to a separate "data location". Note that in various embodiments, the expected value may be any arbitrary value specified as an input to the SCSS operation, rather than a fixed value (e.g., always "0" or always "1"). In some embodiments, the format of the control location may allow it to contain an indication that a software-implemented SCSS is in progress for that control location. To coordinate between hardware and software-implemented SCSS operations, SCSS operations effected using HTM support may in various embodiments check that this indication is false before proceeding. In such embodiments, while the HTM support is effective, the indication remains false, and all SCSS operations may be effected using HTM support. If an SCSS operation for a given control word is unable to complete using HTM support, it may set the indication for that control word, thereby preventing concurrent SCSS operations from succeeding, and allowing the hardware-implemented SCSS operation to access the data location directly without further synchronization (and without special hardware support).

The use of a hybrid SCSS operation may in some embodiments dramatically simplify the design of nonblocking STM systems on systems that support HTM, and may also significantly improve their performance. It may allow these advantages despite the lack of a guarantee that the HTM will always (eventually) succeed, at the cost of occasional blocking when HTM does not succeed. It may in some embodiments further allow such STMs to be developed and tested on existing systems with no HTM support, as the same mechanism may be employed even when HTM is always ineffective (as it would be if it did not exist).

While such functionality may be expressed or used according to a variety of interfaces, the SCSS operation defined by the pseudo-code below illustrates one construct consistent with these concepts:

```
bool SCSS(control_addr, exp_val, data_addr, new_val) {
    atomically {
        if (control_addr == exp_val) {
            data_addr = new_val;
            return true;
        }
        return false;
    }
}
```

The execution of one such SCSS operation is illustrated by the flowchart of FIG. 1. In this example, an atomic SCSS operation on a given memory location (e.g., a memory location used for storing data) is initiated at 100. At 110, the value of a control location associated with the given memory location (and/or specified by the SCSS operation) is read. The value read from the control location is compared with an expected value specified by the SCSS operation, as in 120. If the value of the control location matches the expected value, shown as the positive exit from 120, a new value specified by the SCSS operation is stored in the given memory location, as in 130 and the operation returns a Boolean value of "true", as in 140. This returned value indicates that the SCSS operation successfully stored the new value in the given location. If the value of the control location does not match the expected value, shown as the negative exit from 120, no action is taken with respect to the given memory location (i.e., the new value is not stored in the given memory location), and the operation returns a Boolean value of "false", as in 125. This return value indicates that the SCSS operation failed to store the new value in the given location.

A nonblocking SCSS operation may in some embodiments be easily implemented using hardware transactional memory (HTM), as illustrated by the pseudo-code below:

```
bool SCSS(control_addr, exp_val, data_addr, new_val) {
    bool success = false; fail_addr:
    // optional backoff if desired
    begin_transaction fail_addr
        if (control_addr == exp_val) {
            data_addr = new_val;
            success = true;
        }
    end_transaction
    return success
}
```

In this example, the pseudo-code "begin_transaction fail_addr" is used to begin a hardware transaction attempt that branches to address fail_addr if the transaction does not succeed. For simplicity, some practical details of such an operation, such as code to implement backing off upon retry to reduce contention, are not shown.

Figure 2:
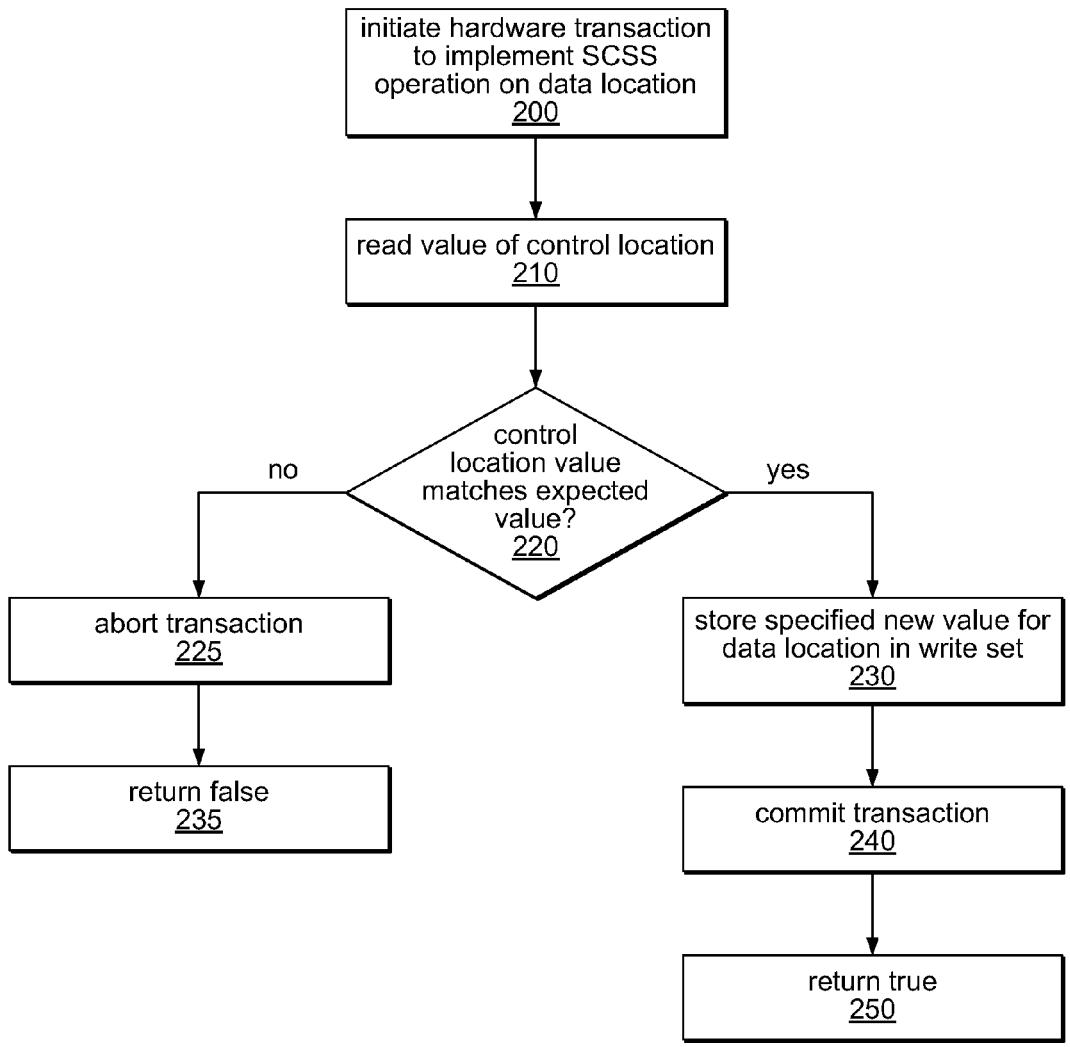
FIG. 2 is a flowchart illustrating a method for executing a nonblocking SCSS operation using a hardware transaction, according to another embodiment.

One method for executing a nonblocking SCSS operation using hardware transactional memory support is illustrated in FIG. 2. In this example, an SCSS operation on a given data location is initiated at 200. At 210, the value of a control location associated with the given data location (and/or specified by the SCSS operation) is read. The value read from the control location is compared with an expected value specified by the SCSS operation, as in 220. If the value of the control location matches the expected value, shown as the positive exit from 220, a new value specified by the SCSS operation is stored in the given data location, as in 230 and the transaction is committed, as in 240. After the transaction is committed, the operation returns a Boolean value of "true", as in 250. This returned value indicates that the SCSS operation successfully stored the new value in the data location. If the value of the control location does not match the expected value, shown as the negative exit from 220, the transaction is aborted without storing the new value in the given data location, as in 225, and the operation returns a Boolean value of "false", as in 235. This return value indicates that the SCSS operation failed to store the new value in the given data location.

The above implementation is straightforward, but it depends on HTM (eventually) being able to commit the transaction. So-called "best effort" hardware transactional memory implementations may support a variety of transactions in a variety of circumstances, but may make no specific guarantees for any given transaction. Indeed, a particular best-effort HTM may in some cases fail a particular transaction deterministically, rendering the above implementation useless. This may occur only rarely, for example because of an unlucky cache mapping, in some embodiments. The hybrid SCSS solution described herein may exploit the benefits of the simple HTM-based solution when it is effective, but may provide a guarantee of success, even if the HTM does not guarantee that all such transactions will (eventually) succeed.

Many best-effort HTM designs will almost always be able to commit such simple transactions, and some implementations will always be able to do so. Even when a given HTM implementations always commits such transactions, its designers may be unwilling to guarantee this. For example, their ability to always commit such transactions may depend on implementation details that the designers do not wish to commit to retaining in future products (e.g., to guarantee forward compatibility with applications that depend on this feature). In the hybrid SCSS solution, the best-effort HTM may always attempt to perform the operation, as shown above, but may integrate a software technique for applying the operation without using HTM support if necessary, such as if the HTM fails repeatedly for a particular SCSS operation.

In some embodiments, it is assumed that no restrictions are made on the contents of the data word accessed by a SCSS operation, though there may be some flexibility in the contents of the control word. For example, in some embodiments, acceptable implementations must allow all $2^n$ values to be stored in a n-bit data word, while it may be acceptable to "steal" one or more values or bits from control locations for special purposes. For clarity, it may be assumed that the set of locations used for control words is separate from the set of locations used for data words. However, persons skilled in the art will appreciate that the invention may be more generally applicable. For example, if control and data locations are allocated dynamically, then one location may serve different purposes at different times.

One application of a hybrid SCSS operation is described by way of example below. Note that this is merely one illustrative example, and is not intended to restrict the scope or applicability of the invention. A previously noted, there has been a wave of interest in transactional memory in recent years, with a number of proposals for supporting it in hardware (HTM), in software (STM), and using a judicious mix of the two, (e.g., Hybrid Transactional Memory). A Hybrid Transactional Memory implementation (HyTM) may in some embodiments include a fully-functional software transactional memory implementation, as well as mechanisms for exploiting best-effort hardware transactional memory, if available, to improve performance. One such HyTM implementation is disclosed in co-pending U.S. patent application Ser. No. 10/915,502, filed Aug. 10, 2004, entitled "Hybrid Hardware/Software Transactional Memory," and naming Mark S. Moir as inventor. Several of the example applications of hybrid SCSS operations described herein are directed to so-called "word-based" STMs, which do not rely on any object infrastructure, and can therefore be used in the implementation of object infrastructure, for example in garbage collectors. It will be understood that the systems and methods described herein may also be applicable to other forms of STM, such as "object-based" STMs, in different embodiments.

As described above, software (and hybrid) transactional memory implementations must provide the illusion of multiple memory locations changing atomically, even though the transaction may be effected using multiple smaller steps of the STM implementation. In one class of STM implementations, this is achieved by transactions maintaining a local "write set" (a set of address-value pairs), and acquiring exclusive ownership of each of the locations it modifies before "copying back" the values in its write set to the affected shared memory locations. One simple way to maintain the illusion of atomicity is to ensure that the transaction maintains ownership of all affected locations until its whole write set has been copied back, and to ensure that other transactions do not observe or modify these locations while they are owned by the first transaction.

The simple approach described above (or some variation on it) is used in many modern STM implementations. While the simplicity of such "blocking" STMs is attractive, they may in some embodiments include potential drawbacks, such as:
- The inopportune delay of one transaction (for example due to preemption or a page fault) may delay progress by other transactions that attempt to access locations in common with the delayed transaction.
- It may not be possible (or prudent) to abort execution of a thread if it might be executing a transaction, because doing so may permanently prevent progress by other threads.
- It may not be possible to use a blocking STM to share data between a thread and a handler for an interrupt that might interrupt that thread, because this may result in a form of deadlock (i.e., the interrupted thread may not run again until the interrupt handler completes, but the interrupt handler may be unable to complete because it is blocked by a transaction the thread was executing when it was interrupted).

The simple STMs described above may be referred to as "blocking" because a transaction cannot acquire ownership of a location while another transaction is copying values back to the location. This is because there may be no way to control when the original owner completes this copying, and in particular there may be a risk that this copying will occur after a later transaction has copied back a value to the same location, causing new-then-old atomicity violations. Existing nonblocking STMs are significantly complicated by the need to avoid such violations.

Given support for a simple operation such as SCSS, described above, nonblocking STMs may in some embodiments be built with similar complexity to existing blocking ones. This is in part because they may provide a simple way to prevent the "late write" scenario described above. For example, in some embodiments, an SCSS operation, or similar, may be used to perform the store of the new value to the affected memory location (i.e., the copy-back) conditional on the value of a control word. In various embodiments, this control word may include the "transaction status" of the copying transaction or an "ownership record" for the affected memory location. By changing the value of the control location, it can be assured that subsequent attempts to store a value to a data word conditional on a particular expected value of the control location fail, thereby eliminating the risk of late writes.

By using such an SCSS implementation, simple STMs may be built that are nonblocking to the extent the underlying system provides. For example, if a particular system guarantees that all simple transactions of the form used in the simple SCSS implementation will (eventually) succeed, then such STMs would be purely nonblocking. In another system in which such transactions almost always succeed, but may occasionally fail, an STM that is almost always nonblocking, but may very occasionally block, may be achieved. As noted above, in some best-effort HTM implementations, such transactions will always eventually succeed. In such cases, the STM may actually be nonblocking, even though it may not be guaranteed to be so.

Figure 3:
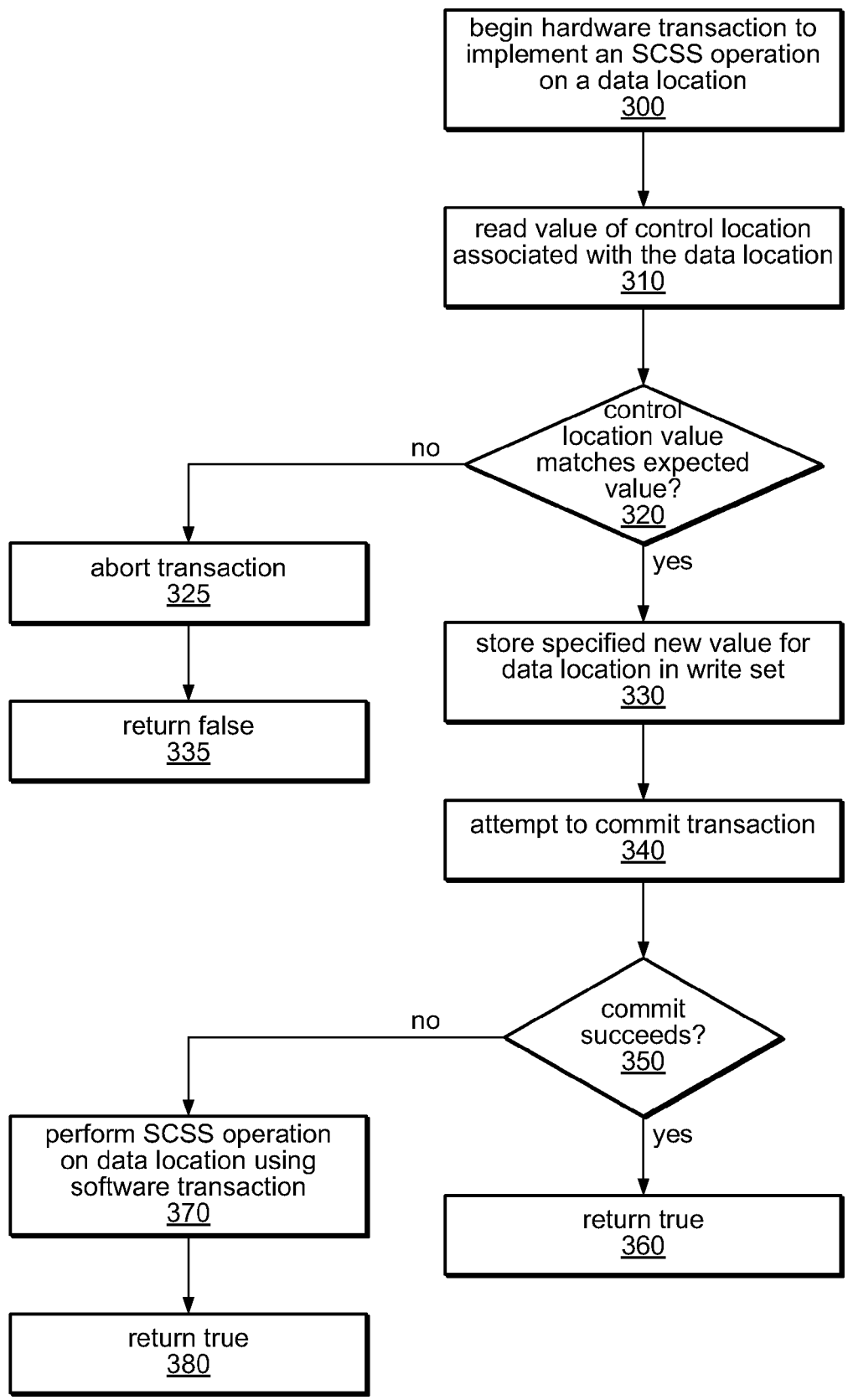
FIG. 3 is a flowchart illustrating the execution of a hybrid SCSS operation, according to one embodiment.

One example of the execution of a hybrid SCCS operation that is usually nonblocking is illustrated by the flowchart in FIG. 3. In this example, an SCSS operation on a given data location is initiated at 300. At 310, the value of a control location associated with the given data location (and/or specified by the SCSS operation) is read. The value read from the control location is compared with an expected value specified by the SCSS operation, as in 320. If the value of the control location does not match the expected value, shown as the negative exit from 320, the transaction is aborted without storing the new value in the given data location, as in 325, and the operation returns a Boolean value of "false", as in 335. This return value indicates that the SCSS operation failed to store the new value in the given data location.

If the value of the control location matches the expected value, shown as the positive exit from 320, a new value specified by the SCSS operation is stored in the write set for the transaction, as in 330. The hardware transaction then attempts to commit the transaction, as in 340. If the commit operation succeeds, shown as the positive exit from 350, the operation returns a Boolean value of "true", as in 360. This returned value indicates that the SCSS operation successfully stored the new value in the data location. If the hardware transaction is not able to commit, shown as the negative exit from 350, the SCSS operation may be performed using a software transaction, as in 370. Once the software transaction is complete, the operation returns a Boolean value of "true", as in 380, indicating that the SCSS operation successfully stored the new value in the data location. Note that in some embodiments, a software transaction may be performed after one failed attempt of a hardware transaction commit operation, while in other embodiments a software transaction may be performed only after multiple attempts have been made to perform the operation using a hardware transaction, but have failed (not shown). For example, a hardware transaction may be re-tried a pre-determined number of times (e.g., pre-configured in hardware or software, or specified as a parameter of the operation) before resorting to a software transaction, in various embodiments.

By using the approach of building a nonblocking STM over SCSS, even if the SCSS implementation is occasionally blocking, the window in which a transaction blocks others may in some embodiments be substantially reduced, e.g., from a period that depends on the size of the transaction amongst other factors, to a few instructions. Coupled with a best-effort HTM implementation that only very rarely fails to commit simple transactions of the form required by an SCSS implementation consistent with this invention, this can make the negative effects of blocking occur so rarely that it may be acceptable in some applications, even if no explicit guarantee is made that transactions will be nonblocking. Furthermore, by reducing the blocking window to a few instructions, the use of a hybrid SCSS solution, as described herein may help to make STM more applicable to a wide variety of real-time applications, because it may eliminate the difficult-to-predict and potentially long blocking times of existing blocking STMs.

In addition, in embodiments that allow flexible compile-time or run-time choices of policy about how many times to retry the SCSS operation using HTM (including zero times), the development and testing of STMs and applications that use them may be performed using existing machines, even if HTM support is unavailable on those machines. This may in some embodiments facilitate substantially more productive testing than would the simulation-based techniques that would otherwise be required.

As noted above, the use of hybrid SCSS techniques may allow multiple threads to be able to execute atomic SCSS-like operations using best-effort HTM support if available, but to use other mechanisms, including those that depend only on standard synchronization support, in case HTM is unavailable, or in case it is (occasionally) ineffective. These techniques may include various means to ensure that these multiple methods correctly interoperate. One such technique is to provide means for a thread to prevent other threads from updating the target data memory location or the specified control location while it checks the control location against the expected value and stores the new value to the specified data location (if the comparison succeeds). One simple way to do so is to designate a single global "lock", which non-HTM-based operations must acquire in order to change either a control location or a data location, and which HTM-based operations must check before proceeding to update a data location dependent on a successful comparison of a specified control location with a specified new value.

Figure 4:
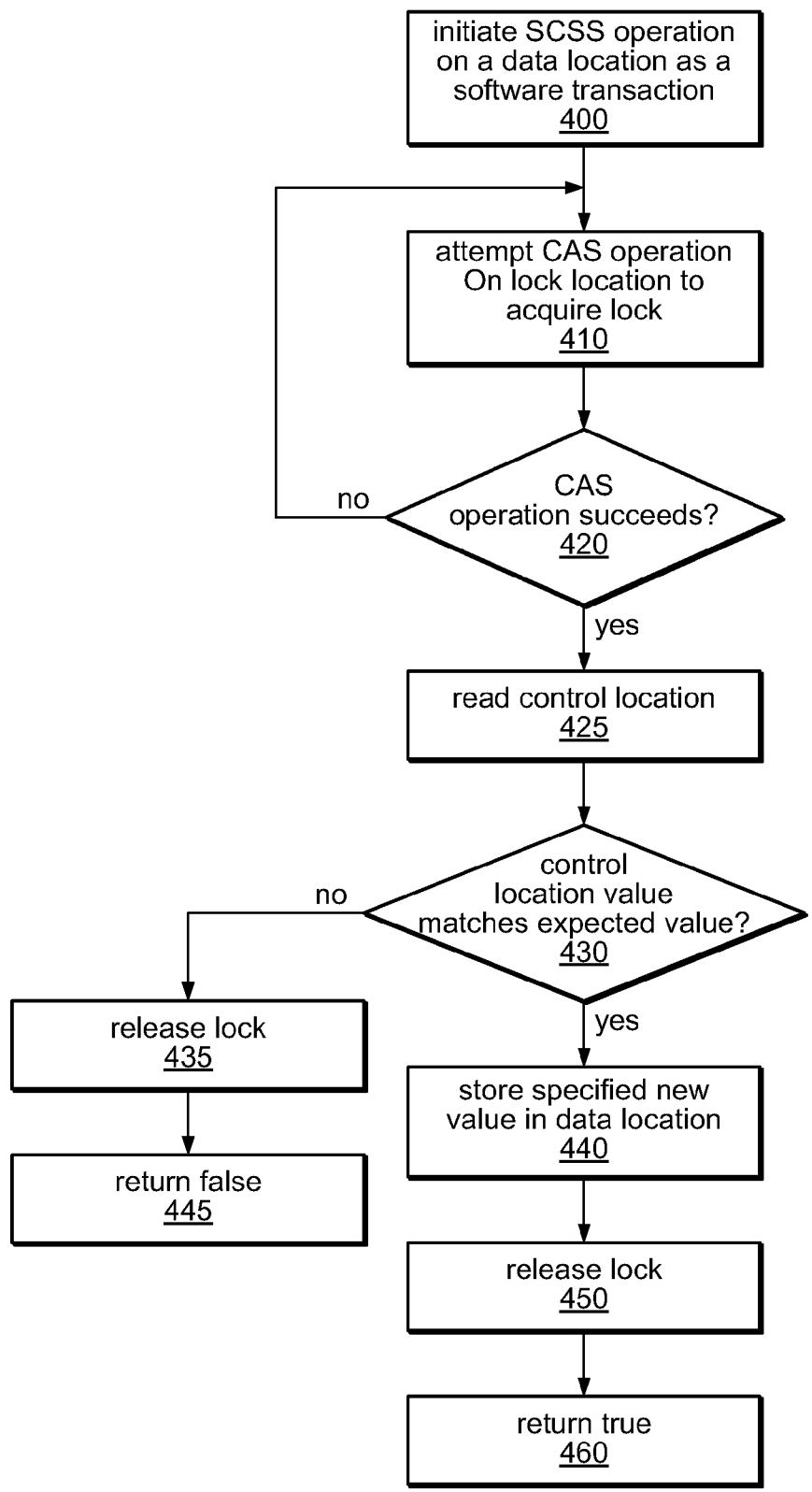
FIG. 4 is a flowchart illustrating one method for executing an SCSS operation using a software transaction, according to one embodiment.

One method for executing an SCSS operation using such a lock location is illustrated in FIG. 4. In this example, an SCSS operation on a data location is initiated as a software transaction, as in 400. The transaction attempts a CAS operation on the lock location to acquire the lock, as in 410. In this example, if the CAS operation does not succeed, shown as the negative exit from 420, it may be retried until it does succeed. This is shown as the feedback loop from 420 to 410. Note that in other embodiments, the CAS operation may not be retried indefinitely, but may be limited to a specified number of retries or may be limited another condition, such as a timeout condition.

In the example illustrated in FIG. 4, if the CAS operation succeeds, whether on the first attempt or a subsequent attempt, the method proceeds. This is shown as the positive exit from 420. At 425, the value of a control location associated with the given data location (and/or specified by the SCSS operation) is read. The value read from the control location is compared with an expected value specified by the SCSS operation, as in 430. If the value of the control location matches the expected value, shown as the positive exit from 440, a new value specified by the SCSS operation is stored in the given data location, as in 440, and the lock is released, as in 450. After the transaction is completed, the operation returns a Boolean value of "true", as in 460. This returned value indicates that the SCSS operation successfully stored the new value in the data location. If the value of the control location does not match the expected value, shown as the negative exit from 430, the lock is released without storing the new value in the given data location, as in 435, and the operation returns a Boolean value of "false", as in 445. This return value indicates that the SCSS operation failed to store the new value in the given data location.

One implementation of an SCSS operation consistent with this simple "single global lock" approach is illustrated by the example pseudo-code below. In this example, the value of shared location "global_lock" may reflect whether this lock location is "HELD" or "AVAILABLE." If the global lock is not held, the SCSS operation can be applied using a hardware transaction that reads the global lock in order to confirm that it is not held. If the lock is held, or if the transaction fails, the hardware transaction may be retried. If the operation repeatedly fails to complete in this manner, the operation may acquire the lock (e.g., using a CAS operation) and perform the SCSS operation without using HTM support.

```
#define AVAILABLE 0
#define HELD 1
lock_type global_lock = AVAILABLE;
bool SCSS(*control_addr, exp_val, *data_addr, new_val) {
    bool success = false;
    int retries = 0;
fail_addr:
    if (retries++ < TOO_MANY_RETRIES) {
        // optional backoff if desired
        begin_transaction failaddr
        if (global_lock != AVAILABLE)
            fail_transaction;
        if (*control_addr == exp_val) {
            *data_addr = new_val;
            success = true;
        }
        end_transaction
    } else {
        while (!CAS(&global_lock, AVAILABLE, HELD)) {
            // optional backoff
        }
        if (*control_addr == exp_val) {
            *data_addr = new_val;
            success = TRUE;
        }
        global_lock = AVAILABLE;
    }
    return success
}
```

Note that in some embodiments, including those described herein, the SCSS operation may only return "false" when the expected value is not observed in the control location. In other embodiments, an SCSS operation having weaker semantics may occasionally return "false" after a maximum number of retries has been attempted without success, or under other conditions, even when the operation does not observe a value other than the expected one in the control location. Persons skilled in the art will readily appreciate variations, optimizations, and simplifications of the embodiments described herein that are applicable when such weaker semantics are acceptable.

Figure 5:
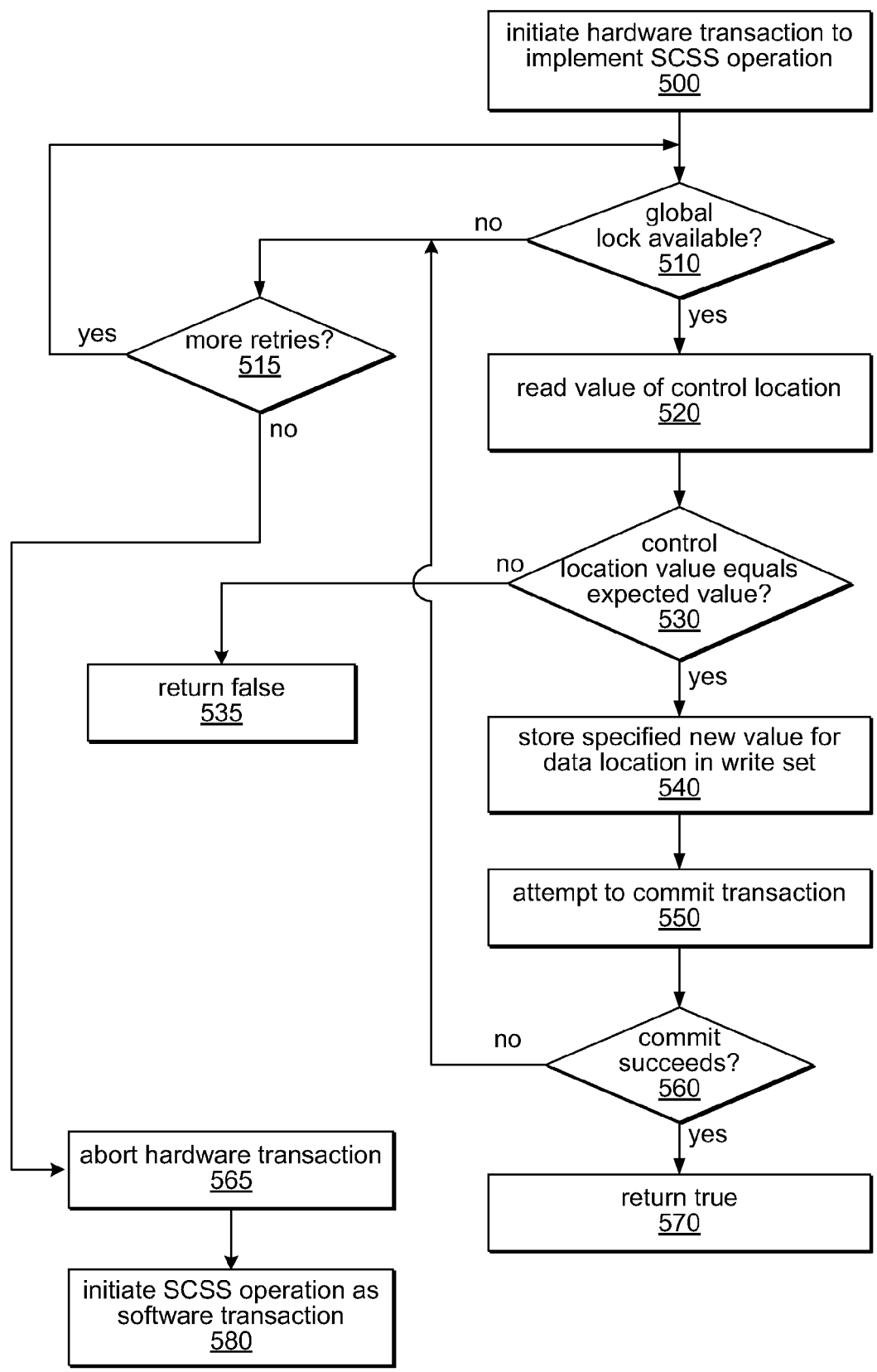
FIG. 5 is a flowchart illustrating the execution of a hybrid SCSS operation, according to one embodiment.

One method for executing a hybrid SCSS operation using a single global lock is illustrated by the flowchart in FIG. 5. The method illustrated in this example may be implemented using program instructions to perform actions similar to those represented by the pseudo-code shown above. In this example, a hardware transaction is initiated to implement an SCCS operation on a data location, as in 500. If the global lock is not available, shown as the negative exit from 510, the hardware transaction may retry its attempt to execute (e.g., by re-reading the global lock location). In some embodiments, the maximum number of retry attempts may be pre-configured in hardware, in software, or as a parameter of the SCSS operation. In the example illustrated in FIG. 5, if there are more retry attempts available, shown as the positive exit from 515, the hardware transaction may retry its attempt to execute, shown as the feedback loop from 515 to 510. If the maximum number of retries have been attempted and have failed, shown as the negative exit from 515, the hardware transaction may be aborted without any change to the value of the data location, as in 565. In this example, a software transaction may be initiated to perform the SCSS operation, as in 580. In some embodiments, this software transaction may be implemented as illustrated in FIG. 4 and as described above. For example, in one embodiment the method of FIG. 5 may continue from 565 to element 410 of FIG. 4, since in this example, the global lock has not yet been acquired. Again note that, as described above, a software transaction may be performed after one failed attempt of a hardware transaction commit operation, or only after multiple attempts have been made to perform the operation using a hardware transaction, but have failed, in different embodiments.

If the global lock is available, shown as the positive exit from 510, the hardware transaction may read the value of a control location associated with the data location, as in 520. If the value of the control location does not match the expected value, shown as the negative exit from 530, the operation returns a Boolean value of "false", as in 535, indicating that the SCSS operation failed to store the new value in the given data location. Note that in some embodiments, if the value of the control location does not match the expected value, the transaction may be aborted without storing the new value in the given data location (not shown). In still other embodiments, if the value of the control location does not match the expected value, the transaction may be committed, even though it will not have written the new value to the given data location, in order ensure that any values read by the transaction were consistent with each other (not shown). Also note that in some embodiments, a failed hardware transaction (i.e., one that read a control value other than an expected value) may not return an indication of its failure (i.e., it may not return "false").

If the value of the control location matches the expected value, shown as the positive exit from 530, a new value specified by the SCSS operation is stored in the write set for the transaction, as in 540. The hardware transaction then attempts to commit the transaction, as in 550. If the commit operation succeeds, shown as the positive exit from 560, the operation returns a Boolean value of "true", as in 570, indicating that the SCSS operation successfully stored the new value in the data location. If the hardware transaction is not able to commit, shown as the negative exit from 560, the hardware transaction may be retried, if a maximum number of retries has not already been exhausted. This is illustrated as the feedback loop from 560 to 515.

The use of a single, global lock location, as illustrated in FIG. 5 and in the pseudo-code above, may in some embodiments have the effect that unrelated SCSS operations may unnecessarily conflict with each other. An approach that avoids the disadvantages of the single global lock may coordinate accesses to control and data locations in a more fine-grained manner. A wide variety of possible ways to achieve this are envisaged. In one embodiment, the method may exploit the fact that there is often an existing (static or dynamic, direct or indirect) mapping between data locations and control locations, and also some flexibility in the data stored in control locations. Several examples of such approaches are described in more detail below, in the context of a word-based STM implementation.

In some embodiments, one or more control locations are used to maintain status information for a software-mediated transaction executing in a software transactional memory (STM) implementation or in a HybridTM implementation to coordinate between hardware-mediated transactions and software-mediated transactions. In such embodiments, an SCSS operation may use the location of the status information for these transactions as a control location for the operation. For example, in various embodiments, a transaction status location and/or an ownership record may be used as a control location in an SCSS operation. One such embodiment is illustrated by way of example below.

In one example, a transaction begins (e.g., in response to a transaction start directive) in state ACTIVE. An active transaction acquires ownership of each transactable location that it reads (or writes) and encodes each updated value in a write set. At some point, an active transaction that has not been aborted attempts to commit. Upon transition to state COMMITTED, the logical state of transactable locations owned by the committed transaction includes values encoded in the committed transaction's write set. Eventually, a logical state encoded in the committed transaction's write set is copied (or written) back to appropriate storage corresponding to the transactable locations (typically the transactable locations themselves). In general, an active transaction may transition to state ABORTED, e.g., if aborted by another transaction that seeks to take ownership of a transactable location owned by the previously active transaction. In some implementations, a FREE state may be employed to encode that a given transactional record is not in use by any thread.

As described above, in some word-based STMs, each transaction maintains a write set, and commits its effects to memory by a) acquiring exclusive ownership of each affected memory location while in ACTIVE status, b) atomically changing its status from ACTIVE to COMMITTED, and c) copying values from its write set to the affected locations. If a transaction requires ownership of a location that is already owned by another transaction, it can abort that transaction (i.e., change the other transaction's status from ACTIVE to ABORTED) in order to prevent the other transaction from committing. In various embodiments, if the other transaction's status is already COMMITTED, then in order to preserve atomicity, it may either wait or it may engage in a complicated protocol to avoid doing so. This complication may arise because it cannot be predicted when the other transaction will complete its writes and thus the contents of the memory location cannot be guaranteed not to change to an "old" value at some arbitrary time in the future.

As described above, in some embodiments, a transaction's status location may encode one of three values: ACTIVE, ABORTED, or COMMITTED. In such embodiments, it may be straightforward to commit an active transaction using a simple synchronization primitive such as provided by a Compare-and-Swap (CAS) operation, a Load-Linked/Store Conditional (LL/SC) operation pair, or the like. Such a primitive may be used in implementations that depend on the ability of one transaction to abort another; that is, to change its status from ACTIVE to ABORTED, and in this case, the aborted transaction should not subsequently commit successfully. Therefore, an STM based on this approach may allow transactions to acquire ownership of locations without changing the logical value of any location, and may be sure that they do not lose ownerships so acquired before successfully committing.

In one embodiment, this may be achieved as follows. When a transaction wants to acquire ownership of a location that is currently UNOWNED, it may simply use CAS to atomically acquire ownership of the location. In this example, transactions do not acquire ownership of locations after committing; therefore, acquiring ownership of an UNOWNED location does not change the logical value of any location. If a transaction t acquires ownership of a location a that is already owned by another transaction $t_0$ while $t_0$ is COMMITTED, then there is a risk that this action may change the logical value of location a (e.g., if $t_0$ contains a pair (a, v) in its write set, and location a contains a value $v0 \neq v$). This possibility should be avoided, because a transaction that is simply attempting to acquire a location in preparation for committing later should not change the logical value of any location. Therefore, in some embodiments, transaction t cannot acquire ownership of location a from $t_0$ while $t_0$ is COMMITTED. Furthermore, t cannot attempt to acquire ownership of location a from $t_0$ while $t_0$ is ACTIVE, because t's attempt might be delayed, and $t_0$ might become COMMITTED in the meantime. If t requires ownership of a, and $t_0$ currently owns a and $t_0$ is ACTIVE, then t can attempt to abort $t_0$, and if this attempt is successful, then it is safe for t to acquire ownership of a from $t_0$. On the other hand, if $t_0$ is COMMITTED, it is not safe for t to simply acquire ownership, as explained above. In this case, t has the following options for acquiring ownership of a without changing its logical value:

1. wait for $t_0$ release ownership of a
2. acquire ownership of a from $t_0$ while ensuring that either:
    a. there is no pair (a, v) for any v in $t_0$'s write set or
    b. there is a pair (a, v) in t0's write set and location a contains v at the moment t acquires ownership While option 1 above is conceptually simple, it may have significant drawbacks, especially if the thread executing transaction $t_0$ has been preempted. Option 2 may be challenging in the case in which there is a pair (a, v) in $t_0$'s write set because it may require t to change location a to contain value v. Note that t may be delayed in attempting to change location a, and that in the meantime, $t_0$ might release ownership of a, and other threads may acquire ownership and change a. Thus, t might belatedly change the contents of location a to v, which by then is an "old" value, resulting in an incorrect change to the logical value of location a. Where there are transparency requirements such that there can be no restrictions imposed by the TM implementations on values stored in transactable locations, traditional means for avoiding such "late" updates, including techniques such as adding version numbers and bounded tags in the transactable location, may not be applicable.

By using an SCSS-like construct to store new values to affected data locations, this phenomenon may in some embodiments be eliminated, thus vastly simplifying the STM. The SCSS operation may in some embodiments exploit the way that ownership is represented in many STMs to eliminate this problem. In early STMs, ownership information was co-located with program data, and in many cases was "shoehorned" into the same words as program data. These techniques are typically not compatible with standard software and compilation techniques, and a big part of making STMs practical involved overcoming this problem. To do so, many current STM implementations maintain a table of "ownership records" (orecs) with some mapping such that each data location maps to a particular orec. Acquiring ownership of a particular data location is thus achieved by acquiring ownership of the associated orec.

Figure 6A:
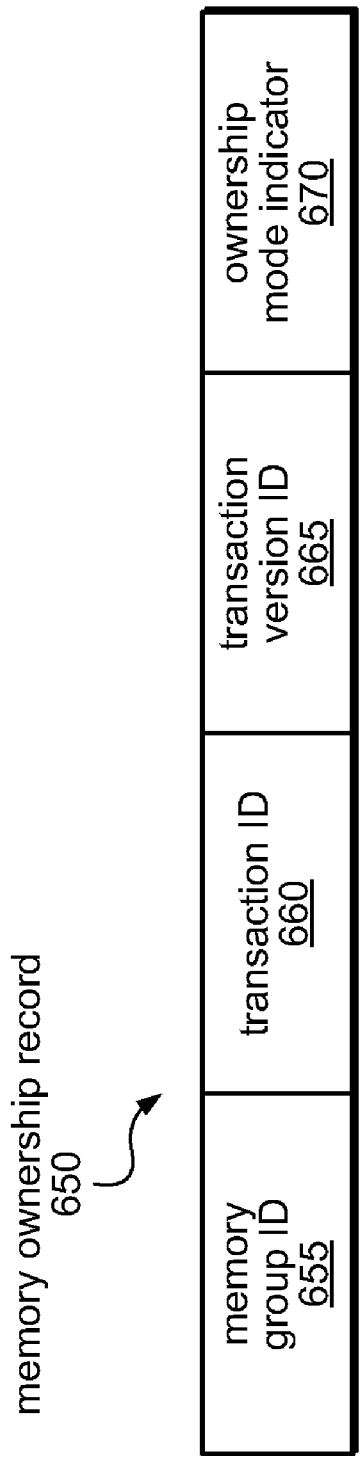
FIG. 6A is a diagram illustrating one embodiment of a memory ownership record.

FIG. 6A illustrates a memory ownership record, according to one embodiment. In this example, memory ownership record 650 includes a memory group identifier 655, indicating a group of memory locations to which the ownership record applies. In different embodiments, a memory group identifier may include an encoding corresponding to a subset of address bits that identifies a block of memory, or an address corresponding to a single location associated with the ownership record, for example. Note that in other embodiments, each memory ownership record may be indexed in a table of ownership records according to the addresses of the memory locations to which it applies, rather than the ownership record including an identifier of the memory group in one of its fields. For example, each ownership record may be indexed in a table of ownership records according to an encoding of a subset of address bit that identify a memory block, or according to a hash of a set of addresses or address bit values corresponding to the memory group.

In the example illustrated in FIG. 6A, the memory ownership record includes a transaction identifier 660, and, optionally, a transaction version identifier 655. These identifiers may indicate the particular transaction (and version of the transaction), if any, which currently holds ownership rights to the corresponding memory group. In different embodiments, transaction identifier 660 may include a transaction number, which may or may not be dependent on a process, thread, processor, or other parameter. Transaction version identifier 655 may in some embodiments be used to further distinguish between transactions. The number of bits used to encode transaction identifier 660 and/or transaction version identifier 655 may be chosen such that transaction identifiers/versions do not wraparound, thus avoiding an ABA problem that may arise if two transactions have the same transaction number.

As illustrated in FIG. 6A, an ownership record may include an ownership mode indicator 670. The value in this field may be encoded to indicate whether the memory group to which the ownership record applies is, for example, not currently owned by any transaction (UNOWNED), owned for read accesses only (READ), or owned for write accesses (WRITE).

In some embodiments, transactions are managed using transaction records maintained in memory. Each transaction record may include a header (e.g., one that includes a status field and, optionally, a version number), a write set, and a read set. The write set may include a set of (a, v) pairs, where there is only one value v for each a in the write set. The read set may include a set of addresses read by the transaction. Each transaction record may be indexed by its transaction number, and/or may include a transaction identification field, in different embodiments. It will be understood that transaction records may include more, fewer, or different elements than those described herein, according to different embodiments.

Figure 6B:
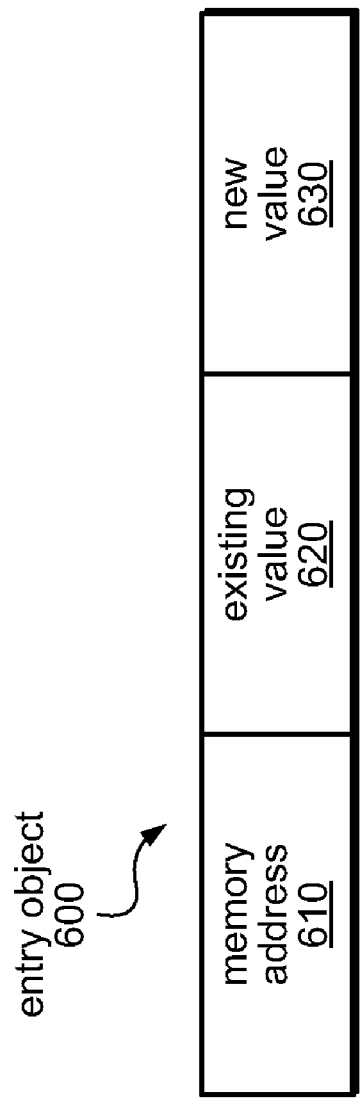
FIG. 6B is a diagram illustrating one embodiment of an entry object in a write set of a transaction record.

FIG. 6B illustrates an entry object in a write set, according to one embodiment. In this example, an entry object 600 includes a memory address 610, an existing value 620 (e.g., the value of the location corresponding to the memory address specified in 610 before the transaction performs any writes to that location), and a new value 630 (e.g., the value most recently written to the location by the transaction).

SCSS-like constructs may be integrated with STMs in at least the following two ways. In both of these examples, transactions may use SCSS operations to copy each value from their write sets to the affected data locations in shared memory, while simultaneously checking that it is still safe to do so. In the first way, in order to store a value back to a data location, the associated orec may be used as the control word for an SCSS-like construct to ensure that the store to shared memory succeeds only if the committing transaction still owns the orec. In this case, competing transactions may prevent the store from occurring by stealing ownership of the orec (thus ensuring that the orec no longer contains the value expected by the committing transaction's SCSS). The competing transaction may thus prevent the committing transaction from belatedly updating a memory location in the future.

Figure 7:
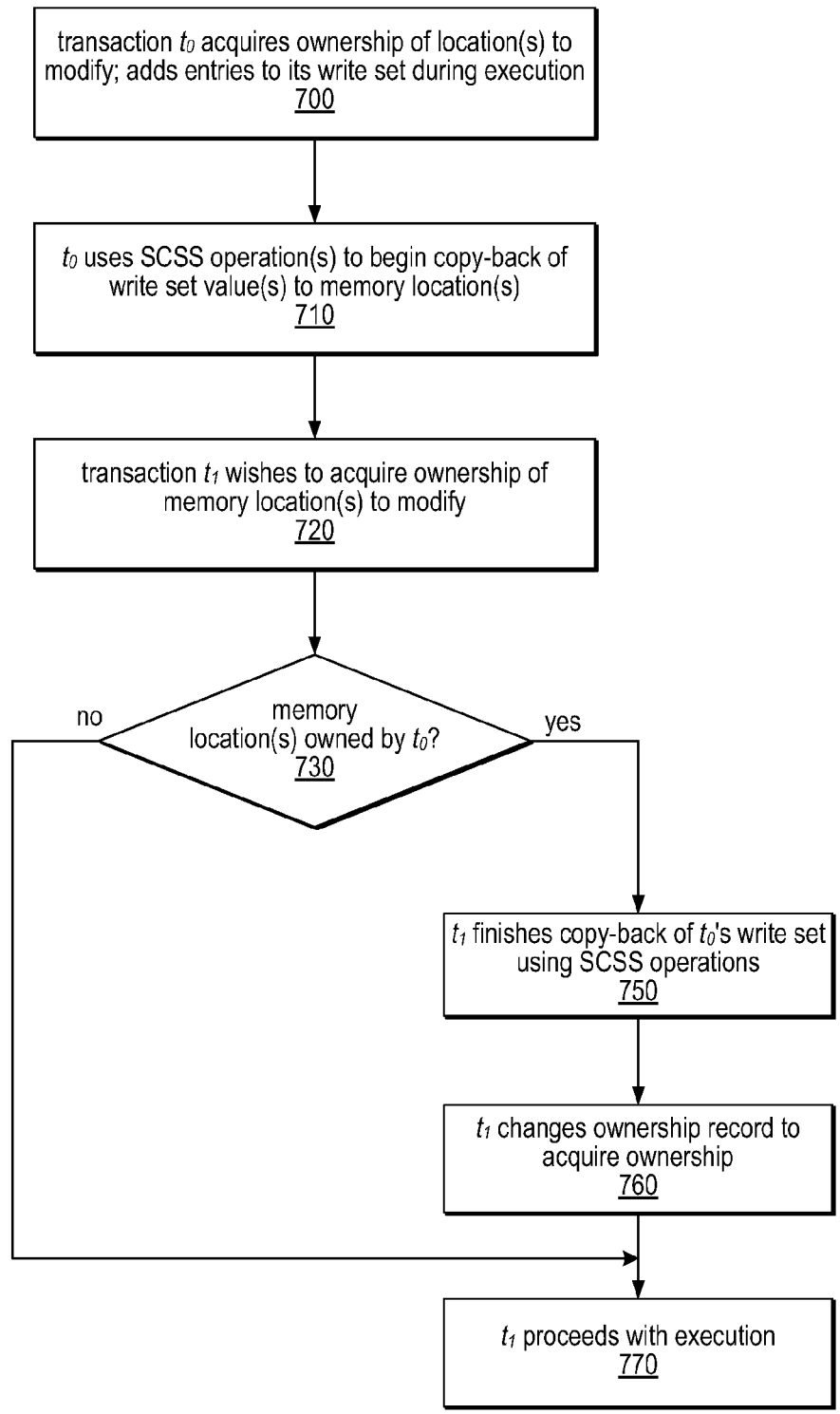
FIG. 7 is a flowchart illustrating the use of an SCSS operation for copying values from a write set to shared memory, according to another embodiment.

FIG. 7 illustrates one example of the use of an SCSS operation in a copy-back operation using an orec as the control word. In this example, a first atomic transaction, $t_0$, may acquire ownership of a given memory location, or group of locations, that it wishes to modify and may add entries to its write set as it executes, as in 700. In this example, $t_0$ may begin copying back its write set to shared memory using an SCSS operation to attempt to write each value from its write set to a shared memory location, as in 710. As illustrated in FIG. 7, a competing transaction $t_1$ may wish to acquire ownership of the given memory location or group of locations for modification, as in 720. If the memory location or locations are still owned by transaction $t_0$, $t_0$ may not have finished its copy-back operations. Rather than waiting for t0 to complete, as in a blocking implementation, in this example $t_1$ may help complete t0's stores before performing its own memory accesses. In some embodiments, an orec for the given memory location or locations (or for a memory group that includes the given memory location or locations) may be examined by a CAS operation of transaction t1 (e.g., when attempting to acquire the orec) to see if the location is UNOWNED, owned for READ accesses only, or owned for WRITE accesses, as described above.

If the memory location is not owned by another transaction (i.e., $t_0$ in this example), shown as the negative exit from 730, $t_1$ may acquire ownership of the location, as in 760. In some embodiments, acquiring ownership may in some embodiments involve changing the value of the orec associated with the memory location(s) by updating the associated orec using the CAS operation used to examine and change the orec or using another suitable write operation. Once $t_1$ has acquired ownership of the location, it may proceed with its own execution, as in 770, and may perform its own copy-back operations using SCSS operations.

If $t_0$ still owns the memory location(s), shown as the positive exit from 730, $t_1$ may finish $t_0$'s copy-back operation by storing the intermediate values from $t_0$'s write set in the shared memory using SCSS operations (as in 750), before acquiring ownership of the location(s) (as in 770). In this example, the SCSS operations used by $t_1$ to complete $t_0$'s copy-back operations will be used to ensure that $t_0$ still owns the orec before performing the stores to shared memory. As described above, $t_1$ may acquire ownership of the memory location(s) by updating the value of the associated orec using a CAS operation, or another suitable write operation, in different embodiments. In some embodiments, updating the orec may involve atomically updating the transaction ID 660 (and, optionally, a transaction version ID 665), and may also involve changing the value of ownership mode 670 (e.g., from UNOWNED or READ to WRITE).

Figure 8:
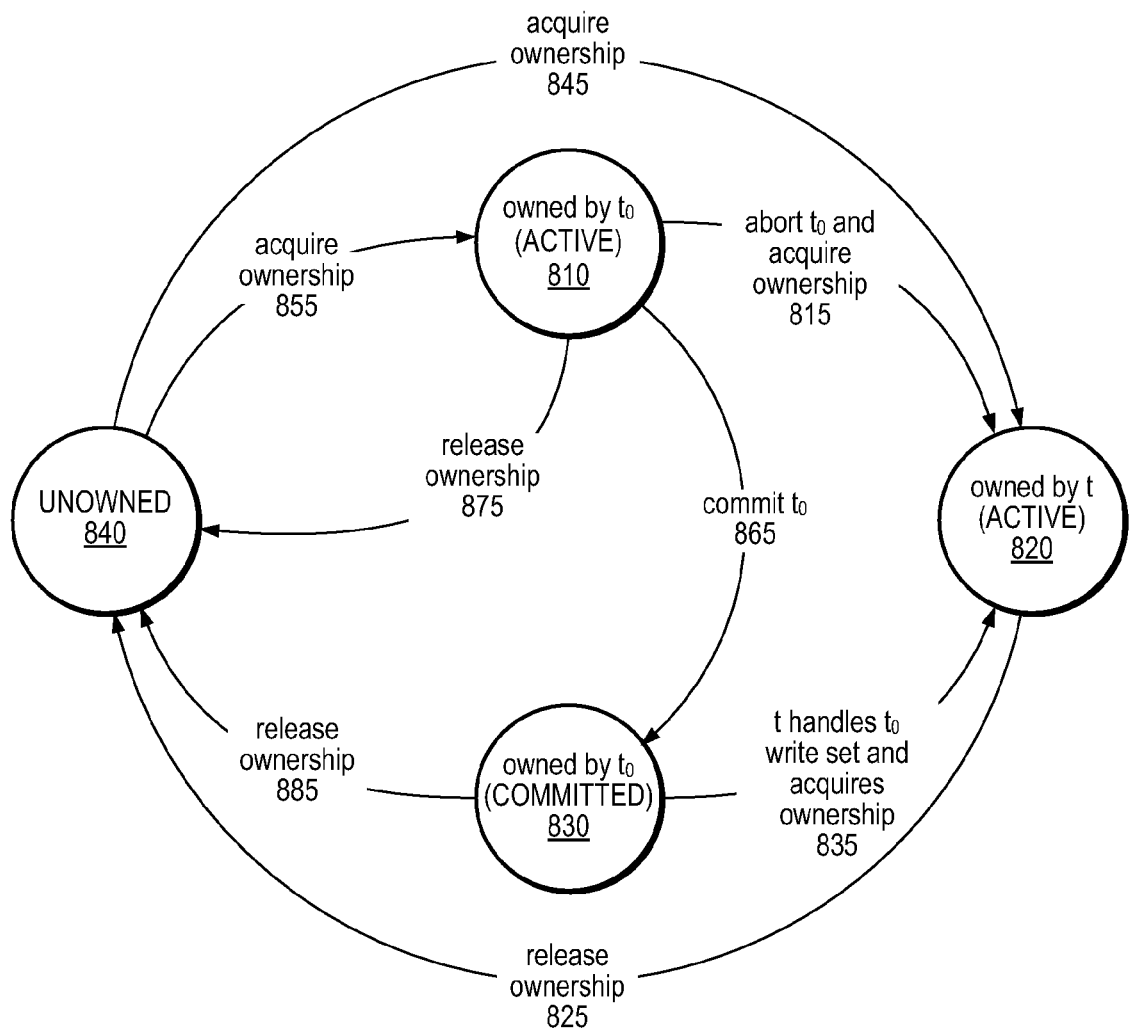
FIG. 8 is a diagram illustrating state transitions for transactions acquiring and releasing ownership of a transactable memory location, according to one embodiment.

Another way to integrate SCSS-like constructs with these STMs is to use the committing transaction's transaction status word as the control location for an SCSS-like construct. FIG. 8, for example, illustrates a set of status transitions for ownership of a transactable location by a transaction executing in a software transactional memory (STM) or hybrid transactional memory implementation (HyTM) such as those described herein. The example illustrated in FIG. 8 depicts a flow in which a transaction t seeks to acquire ownership of a transactable location a, which is owned by a committed transaction $t_0$. In this example, the acquiring transaction t may propagate logical state encoded in the committed transaction's write set. As shown in FIG. 8, ownership of a transactable location a, which is currently not owned by a transaction (e.g., its ownership mode value is UNOWNED), as in state 840, is simply (e.g., through transitions 855 or 845) acquired by a transaction (e.g., $t_0$ or t, respectively) that seeks to do so. Coordination amongst competing acquirers may be handled using a synchronization construct such as a CAS operation, LL/SC operation pair, or the like. If transactable location a is owned (e.g., in a READ, WRITE, or other appropriate mode) by a transaction (e.g., transaction $t_0$) that has not committed (as in state 810), another transaction (e.g., transaction t) may abort the owning uncommitted transaction $t_0$ and acquire ownership of transactable location a (shown as transition 815 to state 820). As described above, in some blocking implementations, transaction t must wait for a committed transaction $t_0$ (as in state 830) to release transactable location a (e.g., through transaction 825) before acquiring ownership of location a. In non-blocking implementations, such as in various embodiments described herein, the acquiring transaction t may instead propagate logical state encoded in the write set of committed transaction $t_0$ (e.g., it may handle $t_0$'s uncommitted write set by completing copy-back operations on behalf of $t_0$ using SCSS operations, as described above) and may then acquire ownership of the location (shown as transition 835, to state 820).

As noted above, SCSS-like constructs may in some embodiments use a committing transaction's transaction status word as the control location when attempting to copy values from the committing transaction's write set to the affected data locations. In such embodiments, the copy-back operations attempted by a transaction may be performed only if the transaction's transaction status word value is COMMITTED. Competing transactions may prevent a late copy-back from occurring by changing the committing transaction's status to some other value such as ABORT, IDLE (e.g., in preparation for reuse) or even COMPLETED (e.g., if some post-transaction cleanup is required).

Note again that whether using a orec or a transaction's transaction status word as a control location, before acquiring an orec or changing the committing transaction's status to IDLE, a competing transaction may ensure that all of the stores of the committing transaction have been completed, by completing them on behalf of the committing transaction, in order to guarantee atomicity. Like the committing transaction, the competing transaction may perform these stores using SCSS or some similar mechanism. In both cases, the method may include steps to avoid the ABA problem. This problem could potentially occur in the second method described above, for example, if one transaction is helping another to complete copying back its write set, and the helped transaction meanwhile completes its own copying, and starts again reusing the same transaction descriptor. In this case, the helping transaction may use its SCSS to (incorrectly) confirm that the previous transaction's status is still COMMITTED, and thus erroneously copy back a value from the previous transaction. In some embodiments, STMs incorporate mechanisms to avoid this problem, such as associating version numbers with transactions and/or orecs, or allocating a fresh transaction descriptor for each new transaction and preventing premature reclamation of these descriptors that might allow the ABA problem to occur.

Because the control locations used in the two above-described embodiments of this invention (i.e., transaction descriptors and orecs) do not contain program data, there may be flexibility in the values stored in them, and in particular, it is usually practical to be able to "steal a bit" from them. This may allow the integration of a fine-grained implementation of SCSS-like mechanisms, because such a bit may be configured to indicate whether a thread is using an alternative mechanism for effecting the SCSS-like operation, rather than using best-effort HTM, e.g., by setting the bit in such cases. This approach may in some embodiments yield the benefits of being fine-grained while avoiding the overhead required to access this information in a separate memory location from the control word (which must be accessed anyway).

Figure 9:
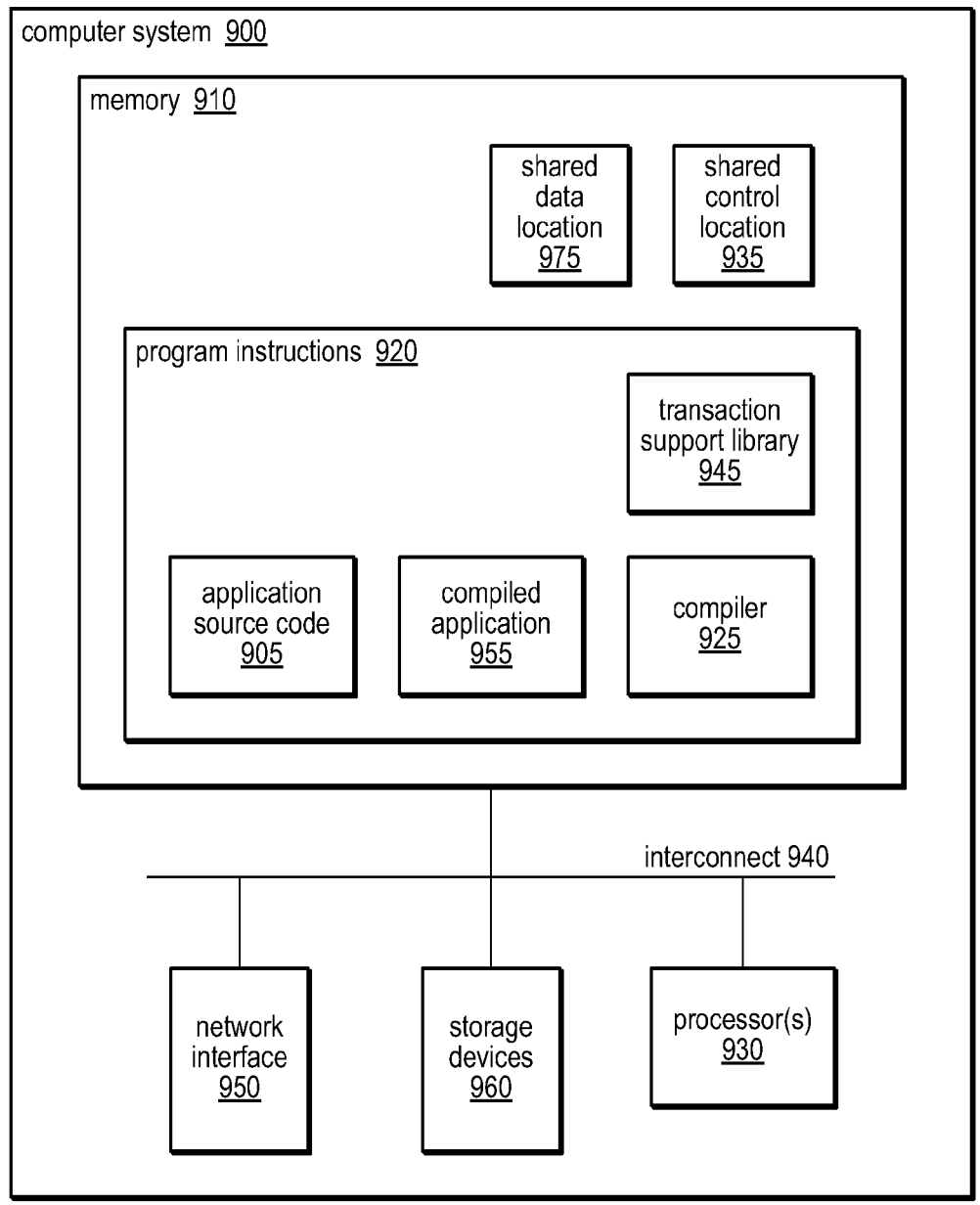
FIG. 9 is a block diagram illustrating an exemplary computer system capable of implementing hybrid SCSS operations, according to one embodiment.

The system and methods described herein may be suitable for application in any of various computing systems supporting concurrent computing. FIG. 9 illustrates a computing system capable of implementing hybrid SCSS operations, as described herein and according to various embodiments. Computer system 900 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The described invention may be provided as a computer program product, or software, that may include a computer-readable storage medium having stored thereon instructions, which may be used to program a computer system (or other electronic devices) to perform a process according to the present invention. A computer-readable medium includes any mechanism for storing information in a form (e.g., software, processing application) readable by a machine (e.g., a computer) and executable by the machine to implement the methods described herein. The machine-readable medium may include, but is not limited to, magnetic storage medium (e.g., floppy diskette); optical storage medium (e.g., CD-ROM); magnetooptical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer system 900 may include a processor unit 930 (possibly including multiple processors, a single-threaded processor, a multi-threaded processor, a multi-core processor, etc.). The computer system 900 also includes one or more system memories 910 (e.g., one or more of cache, SRAM, DRAM, RDRAM, EDO RAM, DDR RAM, SDRAM, Rambus RAM, EEPROM, etc.), a system interconnect 940 (e.g., LDT, PCI, ISA, etc.), a network interface 950 (e.g., an ATM interface, an Ethernet interface, a Frame Relay interface, etc.), and a storage device(s) 960 (e.g., optical storage, magnetic storage, etc.). The memory medium may include other types of memory as well, or combinations thereof. Embodiments of the invention may include fewer or additional components not illustrated in FIG. 9 (e.g., video cards, audio cards, additional network interfaces, peripheral devices, etc.). The processor unit 930, the storage device(s) 960, the network interface 950, and the system memory 910 are coupled to the system interconnect 940. One or more of the system memories 910 may embody a compiler configured to generate program instructions for implementing hybrid SCSS operations as described herein. Additionally, one or more of the system memories 910 may embody an application including code implementing hybrid SCSS operations.

In some embodiments, memory 910 may include program instructions 920 configured to implement a compiler, such as compiler 925, configured to generate program instructions for implementing hybrid SCSS operations, as described herein. Additionally, program instructions 920 may comprise application source code 905 and/or compiled application 955, each of which may include code configured to implement hybrid SCSS operations, as described herein. Furthermore, program instructions 920 may be configured to implement a transaction support library 945, configured to provide functions, operations and/or other processes for implementing hardware transactional memory, software transactional memory, and/or hybrid transactional memory, as described herein. Compiler 925, application source code 905, compiled application 955, and/or transaction support library 945 may each be implemented in any of various programming languages or methods. For example, in one embodiment, compiler 925 and transaction support library 945 may be Java™ based, while in other embodiments, they may be written using the C or C++ programming languages. Similarly, application source code 905 may be implemented in Java™, C, or C++, among other programming languages, according to various embodiments. Moreover, in some embodiments, compiler 925, transaction support library 945, and application source code 905 may not be implemented using the same programming language. For example, application source code 905 may be C++ based, while compiler 925 may be developed using C.

As illustrated in FIG. 9, memory 910 may in some embodiments be configured to include one or more shared data locations 975 and associated shared control locations 935, as well as other data structures described herein. For example, in various embodiments, storage locations representing ownership records, transaction records (including headers, write sets and/or read sets, as described herein), and other local or shared resources may be included in memory 910. Note also that although various examples included herein refer to both shared memory and local memory (e.g., cache memory), these structures may be implemented as different memory spaces (e.g., a shared memory space and one or more local memory spaces) within a single physical memory or as different memory spaces distributed across any number of physical memories, in different embodiments.

While the invention has been described with reference to various embodiments, it will be understood that these embodiments are illustrative and that the scope of the invention is not limited to them. Although the embodiments above have been described in detail, numerous variations and modifications will become apparent once the above disclosure is fully appreciated. Many variations, modifications, additions, and improvements are possible. More generally, the present invention is described in the context of particular embodiments. For example, the blocks and logic units identified in the description are for understanding the described invention and not meant to limit the described invention. Functionality may be separated or combined in blocks differently in various realizations of the invention or described with different terminology. Plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow. It is intended that the following claims be interpreted to embrace all such variations and modifications.

What is claimed is:

1. A computer-implemented method, comprising:
    comparing a control value stored in a control location in memory to a specified expected value; and
    in response to determining that the control value stored in the control location matches the expected value:
        storing a new value in a data location in memory, wherein the data location and the control location comprise distinct locations in memory; and
        returning an indication that the new value was successfully stored in the data location;
    wherein said comparing, said storing, and said returning are performed atomically as part of a software-mediated transaction, such that they appear to take effect together without any intervening change in the value of the data location and without any intervening change in the control value.

2. The method of claim 1, wherein the data location comprises a location in a shared transactional memory.

3. The method of claim 1, wherein the data location comprises a location in a shared memory supporting a hardware transactional memory implementation, and wherein said comparing, said storing, and said returning are performed in response to a failure of a hardware transaction to successfully perform said comparing, and said storing.

4. The method of claim 3, wherein the failure of said hardware transaction is not a first failure of said hardware transaction, and wherein the number of failures of said hardware transaction exceeds a pre-determined maximum number of failures.

5. The method of claim 1, further comprising, prior to said comparing, reading a value of a global lock configured to indicate whether another software-mediated transaction is currently in progress; wherein said comparing, said storing, and said returning are performed in response to determining that the value of the global lock indicates that no other software-mediated transactions are currently in progress.

6. The method of claim 1, wherein the control value comprises a transaction status indicator.

7. The method of claim 1, wherein the control value comprises at least a portion of an ownership record associated with the data location.

8. The method of claim 7, further comprising:
determining if the at least a portion of an ownership record indicates that the data location is owned by another transaction, and
in response to determining that the data location is owned by another transaction:
prior to said storing, copying one or more values in a write set of the other transaction to respective data locations and acquiring ownership of the data location.

9. A system comprising:
one or more processors; and
a memory coupled to the one or more processors and comprising a shared data location and a shared control location;
wherein the memory further comprises program instructions executable by the one or more processors to initiate an atomic software-mediated transaction comprising:
comparing a control value stored in the control location to a specified expected value; and
in response to determining that the control value matches the expected value, storing a new value in the data location; and
returning an indication of whether the new value was stored in the data location.

10. The system of claim 9, wherein the program instructions are further executable by the one or more processors to attempt said comparing and said storing as a hardware transaction, and wherein the program instructions are executable to initiate said software-mediated transaction to perform said comparing, said storing, and said returning in response to a failure of said hardware transaction.

11. The system of claim 10, wherein the failure of the hardware transaction is not a first failure of the hardware transaction, and wherein the number of failures of the hardware transaction exceeds a pre-determined maximum number of failures.

12. The system of claim 9, wherein the shared memory further comprises a global lock configured to indicate whether a software-mediated transaction is currently in progress, and wherein the program instructions are further executable to implement:

prior to said comparing, determining if the global lock indicates that another software-mediated transaction is currently in progress; and
in response to determining that another software-mediated transaction is currently in progress, retrying the atomic software-mediated transaction.

13. The system of claim 9, wherein the control value comprises a transaction status indicator.

14. The system of claim 9, wherein the control value comprises at least a portion of an ownership record associated with the data location.

15. The system of claim 14, wherein the program instructions are further executable to implement:
determining if the at least a portion of an ownership record indicates that the data location is owned by another transaction, and
in response to determining that the data location is owned by another transaction:
copying one or more values in a write set of the other transaction into respective data locations;
acquiring ownership of the data location;
storing the new value for the data location in a write set of the atomic transaction;
attempting to commit the write set for the atomic transaction; and
returning an indication of whether the new value was stored in the data location.

16. The system of claim 14, wherein the program instructions are further executable to implement:
determining if the at least a portion of an ownership record indicates that the data location is owned by another transaction, and
in response to determining that the data location is owned by another transaction, aborting the other transaction.

17. A computer-readable storage medium comprising program instructions computer-executable to implement:
initiating an atomic transaction comprising:
comparing a control value stored in a shared control location to a specified expected value;
in response to determining that the control value matches the expected value, attempting to store a new value in a shared data location; and
returning an indication of whether the new value was stored in the data location;
wherein the atomic transaction is attempted as a hardware transaction, and wherein in response to a failure of the hardware transaction, the program instructions are further executable to initiate a software-mediated transaction to perform said comparing, said storing, and said returning.

18. The storage medium of claim 17, wherein the program instructions are further executable to implement:
prior to said comparing, determining if a global lock indicates that a software-mediated transaction is currently in progress, wherein the global lock is configured to indicate whether a software-mediated transaction is currently in progress; and
in response to determining that a software-mediated transaction is currently in progress, aborting the atomic transaction.

19. The storage medium of claim 17, wherein the control value comprises at least a portion of an ownership record associated with the data location, and wherein the program instructions are further executable to implement:
determining if the at least a portion of an ownership record indicates that the data location is owned by another transaction, and in response to determining that the data location is owned by another transaction:
  copying one or more values in a write set of the other transaction into respective data locations;
  acquiring ownership of the data location;
  storing the new value for the data location in a write set of the atomic transaction;
  attempting to commit the write set for the atomic transaction; and
  returning an indication of whether the new value was stored in the data location.

20. The storage medium of claim 18, wherein the control value comprises a transaction status indicator.

* * * * *